Dec. 2, 1930.  V. L. TANNEHILL  1,783,634
CONTROL MECHANISM FOR ELECTRIC MOTORS
Filed May 2, 1927  2 Sheets-Sheet 2
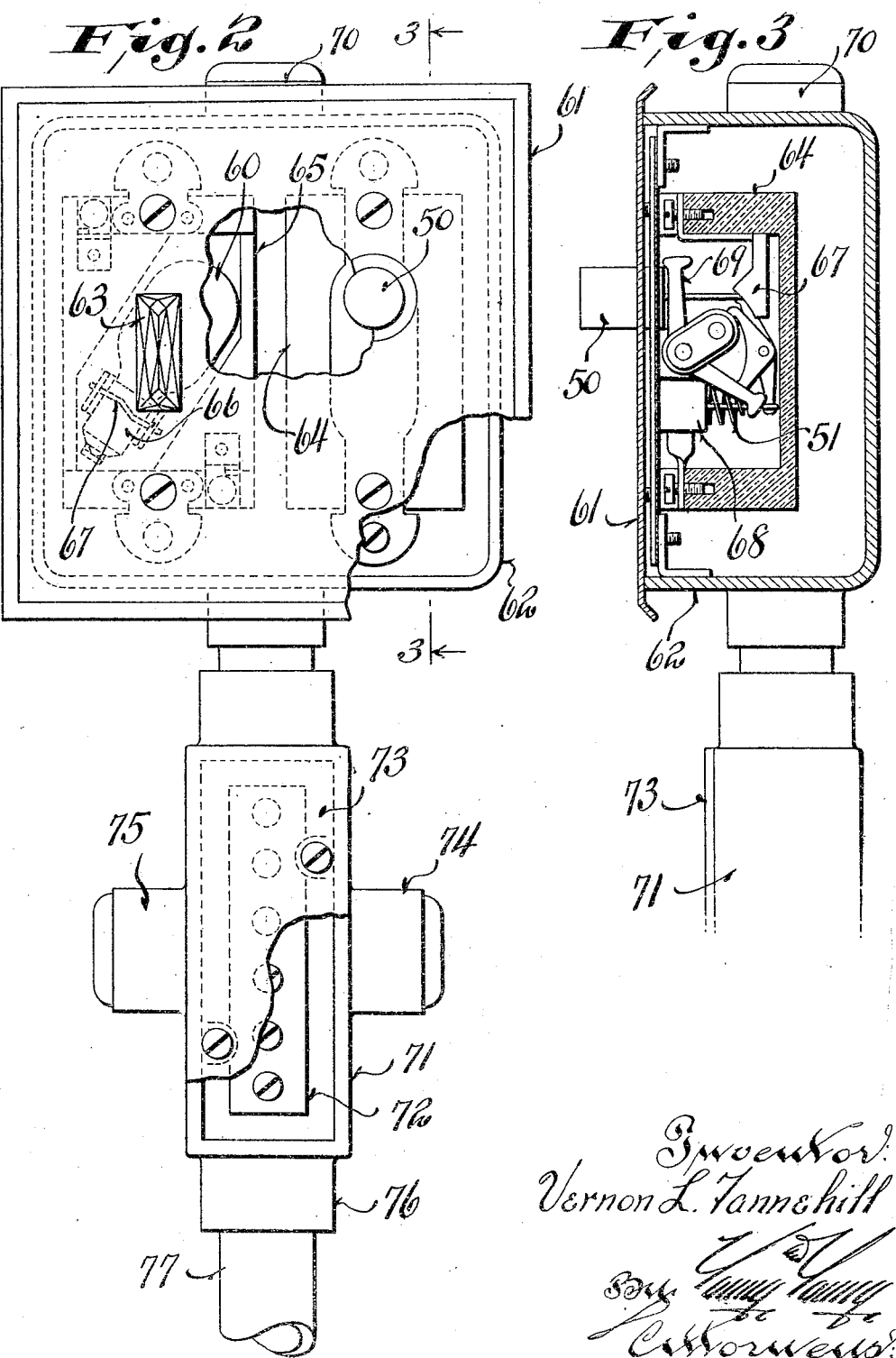
Inventor
Vernon L. Tannehill Patented Dec. 2, 1930

1,783,634

UNITED STATES PATENT OFFICE

VERNON L. TANNEHILL, OF FORT WAYNE, INDIANA, ASSIGNOR TO FORT WAYNE ENGINEERING AND MANUFACTURING COMPANY, OF FORT WAYNE, INDIANA

CONTROL MECHANISM FOR ELECTRIC MOTORS

Application filed May 2, 1927. Serial No. 188,175.

This invention relates to control mechanism for electric motors, such for instance, as those for operating a mechanism passing through a complete cycle, as, for example, the mechanism used in association with automatic or semi-automatic water softeners.

Objects of this invention are to provide a control mechanism for electric motors which causes the motor to operate mechanism through a complete cycle and which is manually initiated or thrown into operation and automatically arrested after the required number of revolutions to complete the cycle executed by the motor.

Further objects are to provide a remote control mechanism for initiating the operation of the motor which is associated with a tell-tale or indicating mechanism for indicating whether or not the motor is supplied with electric energy and has automatically closed its own circuit, although the manually operated switch or button may have been released, as will appear hereinafter.

Further objects are to provide a device in which the remote control switch and tell-tale lamp or other indicating device are compactly arranged in a pleasing and attractive manner and are so associated that they may be readily attached to a standard conduit or other type of support.

A further object of this invention is to provide a novel form of automatic cut-off for the motor which is associated with the motor and, although it may be slowly driven thereby nevertheless provides a very quick break or cut-off in the motor circuit to prevent wear or arcing at the contacts.

This invention is adapted for use in connection with the water softener mechanism disclosed in Patents #1,732,702 granted to me October 22, 1929 and #1,713,105 granted to me May 14, 1929.

An embodiment of the invention is shown in the accompanying drawings in which:

Figure 2 is a view of the control switch box with parts broken away;

Figure 3 is a sectional view on the line 3—3 of Figure 2.

Figure 1:
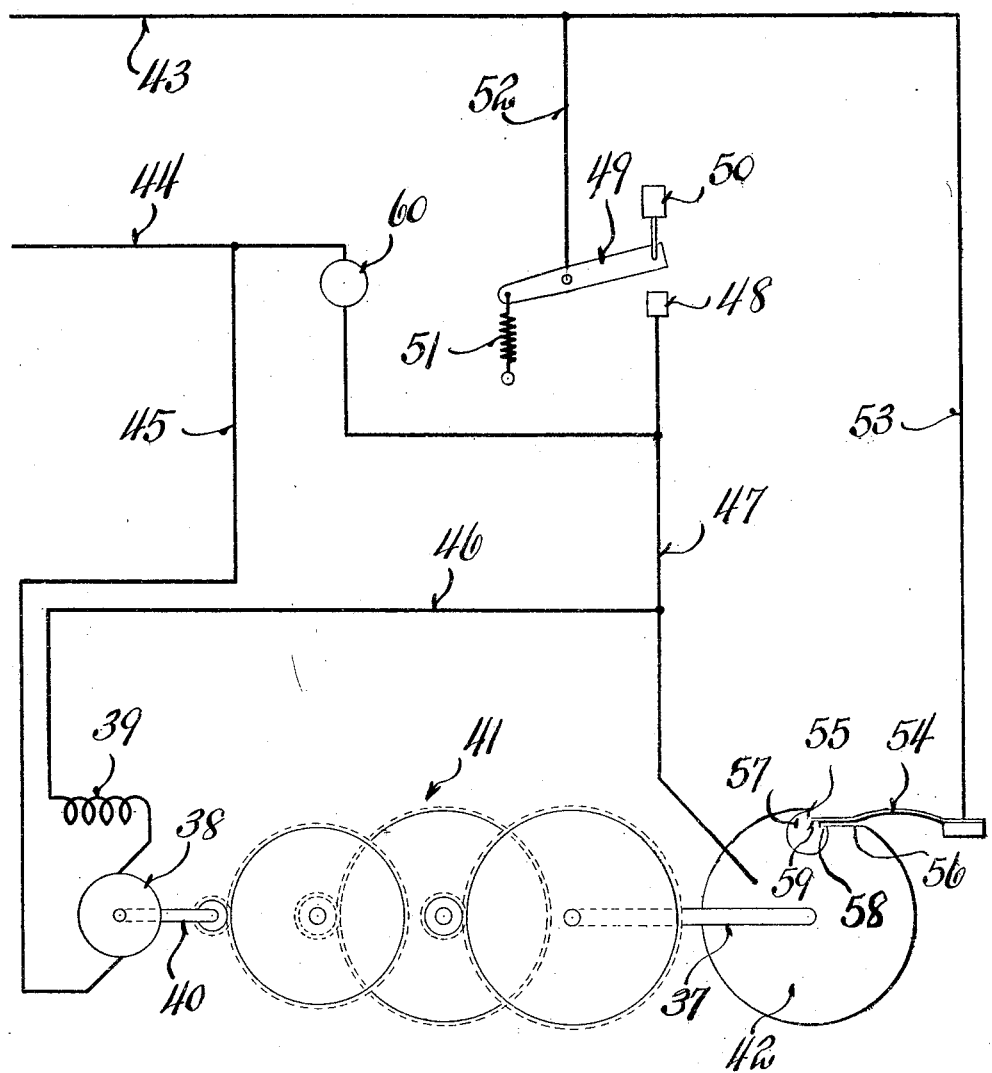
Figure 1 is a diagrammatic view showing the wiring circuits and a portion of the mechanism driven by the motor.

Referring to Figure 1, it will be seen that an electric motor has been indicated which may be of either the series, shunt, or other type. It comprises an armature 38 and a field coil 39. The armature shaft 40 is connected by reduction gearing, indicated generally by the reference character 41, with a metal disc 42. This metal disc is very slowly driven by the motor and is adapted to cut off the motor, or in other words, open its circuit when the disc has made one complete revolution. Mechanism of this type may be used with any device in which a complete cycle of operations is manually initiated and automatically performed, such, for example, as in the regeneration and control of water softeners.

The supply mains for furnishing the current to the motor are indicated by the reference characters 43 and 44. The main 44 is connected by means of a conductor 45 with one side of the motor. The other side is connected by means of the conductors 46 and 47 to one of the contacts 48 of a manually controlled push button or switch. The switch may comprise a quick motion lever 49 of any suitable type operated by a push button 50 to close the circuit, such circuit being opened by means of the spring 51. The knife blade or lever 49 of the switch is connected by means of the conductor 52 to the main 43. Thus, when the switch is closed, energy is supplied the motor and it starts to operate.

An auxiliary circuit is formed for maintaining the motor circuit closed during the cycle of operations and means are placed in this circuit for automatically opening the motor circuit after the cycle has been performed. This auxiliary circuit comprises a conductor 53 which leads to a spring brush 54 adapted to bear upon the disc 42. The disc 42 is connected to the conductor 46, as indicated diagrammatically in Figure 1, and of course this connection may be made by means of a brush and slip ring. The disc 42, it will be noted, is provided with a radial shoulder 55 and with a flat shoulder or face 56 approximately at right angles to the radial shoulder 55. Further, the disc is bored out transversely and a cylindrical insulating block 57 is driven into this bored out portion. This insulating block is provided with a radial face approximately aligning with the radial face 55 of the disc 42 and is provided with a lower face or inner face 58 parallelling and slightly below the face 56 of the disc 42. It is also provided with a shouldered or stepped portion 59 intermediate the peripheral portion of the disc and the flat face 56 thereof. The position of the parts, as shown in Figure 1, are such that the motor circuit is opened.

Assume, however, that it is desired to initiate the operation of the motor. All that is necessary is for the operator to depress the button 50, thus closing the motor circuit. The motor starts and after a short interval the brush 54 contacts with the metal disc or ring 42, and an auxiliary circuit is established for the motor around the manually controlled switch, as it will be seen that this manually controlled switch is bridged around the brush and disc. The motor, therefore, continues to operate, although the operator releases the push button and allows the manually controlled switch to open. The motor continues to operate until the disc 42 and shaft 37 have executed a complete revolution. At this time, the spring brush quickly snaps inwardly from the periphery of the disc and seats against the shoulder 59 of the insulated plug or block 57. This produces a quick break in the motor circuit and prevents arcing and wear of the contents although the disc is itself slowly driven.

When the operation just described occurs the motor circuit is opened and further operation of the motor is prevented.

It is desirable to have the manually controlled switch located at a point remote from the motor, for example, the motor may be placed in the cellar and the remote control switch in the kitchen, or other desirable place, when the device is used in connection with an automatic or semi-automatic water softener.

In order to apprise the operator of the condition of the motor, that is to say, whether or not it is supplied with electric energy, a tell-tale lamp 60 is provided and is connected across the motor terminals or conductors 45 and 46, as indicated in Figure 1. Thus, when energy is supplied the motor the lamp is lighted and a signal is thereby given the operator. Obviously, when the motor circuit is opened by the automatic mechanism described, the lamp is extinguished.

It will be seen that a manually initiated, automatically controlled mechanism has been provided, which is of simple and reliable construction and in which remote control and indicating means are provided.

This remote control and indicating means may be very readily grouped in a compact formation such, for example, as shown in Figures 2 and 3. For instance, the push button 50 may project through the front plate 61 of a switch box 62. In addition to this, the lamp 60 may be positioned behind this front plate 61, and the plate 61 may be apertured and provided with a colored, transparent, and ornamental member 63, through which the light from the lamp passes. Preferably, the switch is carried in a porcelain or other type of receiving box 64 (see Figure 3) and the lamp is similarly carried in a receiving box 65 of porcelain. Preferably, also the lamp has its base portion 66 carried in a pivotally mounted bracket 67 to facilitate insertion and removal thereof. The members 64 and 65 may be of standard construction and need not therefore be described in detail. The switch may be provided with any suitable quick motion mechanism of the conventional form, as indicated partially in Figure 3. In the form shown, this switch may be provided with the contacts 67 and 68 between which the switch arm 69 corresponding to the arm indicated diagrammatically at 49 operates. This switch arm is given a quick make and break motion by mechanism of any suitable and ventional type. It is urged into open position by means of the spring 51 and is pressed into closed position by means of the button 50. The conductors from the mains may pass into the upper portion of the box through an inlet portion 70 and the box may be supported from a distribution box or outlet box 71, as shown particularly in Figure 2. This outlet box may carry a distribution panel 72 and may have a removably held closure plate 72. It is also preferably provided with outlet portions 74 and 75 for the motor leads and for the leads extending to the automatically opened contact mechanism, previously described. The inlet and outlet portions 70, 74, and 75 may be screw threaded in the usual manner for the reception of conduits, or may be bushed with insulating members, as indicated in the drawings. The lower end of the outlet box is provided with an extension 76 adapted to receive a suitable support, such as the pipe 77, so that the entire control and indicating mechanism may be readily mounted upon the standard or support.

It will be seen that a very simple type of automatically controlled and indicating mechanism for remotely controlling the electric motor has been provided and in which a quick break is automatically attained and, consequently sparking and wearing of the parts is prevented.

Although the invention has been described in considerable detail, such description is intended as illustrative rather than limiting as the invention may be variously embodied and as the scope of such invention is to be determined as claimed.

I claim:

An electric control for motors including a disc provided with a cut-away part forming a radial shoulder and a flat face at right angles to the shoulder, said disc having an opening adjacent the shoulder and face, an insulating block positioned within the opening, and having a shoulder aligning with the shoulder on the disc, a flat face on said block at right angles to the shoulder and disposed in a plane outwardly of the plane of the flat face on the disc and a second flat face on the block disposed inwardly of the flat face on the disc.

In testimony that I claim the foregoing I have hereunto set my hand at Fort Wayne, in the county of Allen and State of Indiana.

VERNON L. TANNEHILL.